(12) United States Patent
Maunder et al.

(10) Patent No.: US 8,805,820 B1
(45) Date of Patent: Aug. 12, 2014

(54) SYSTEMS AND METHODS FOR FACILITATING SEARCHES INVOLVING MULTIPLE INDEXES

(75) Inventors: Anurag Maunder, Fremont, CA (US); Sathyanarayaman Kavacheri, Fremont, CA (US); Christos Tryfonas, San Francisco, CA (US); Sudhakar Muddu, Milpitas, CA (US)

(73) Assignee: EMC Corporation, Hopkinton, MA (US)

( * ) Notice: Subject to any disclaimer, the term of this patent is extended or adjusted under 35 U.S.C. 154(b) by 379 days.

(21) Appl. No.: 12/098,342

(22) Filed: Apr. 4, 2008

(51) Int. Cl.
*G06F 7/00* (2006.01)
*G06F 17/30* (2006.01)

(52) U.S. Cl.
CPC ...... *G06F 17/3002* (2013.01); *G06F 17/30023* (2013.01); *G06F 17/30312* (2013.01); *G06F 17/30457* (2013.01); *G06F 17/30486* (2013.01)
USPC .......................................................... 707/715

(58) Field of Classification Search
CPC .......... G06F 17/3002; G06F 17/30023; G06F 17/30312; G06F 17/30457; G06F 17/30486
See application file for complete search history.

(56) References Cited

U.S. PATENT DOCUMENTS 5,884,304 A * 3/1999 Davis et al. ........................... 1/1
7,720,860 B2 * 5/2010 Hornkvist ..................... 707/769

OTHER PUBLICATIONS

Theobald et al., "The Index-Based XXL Search Engine for Querying XML Data and Relevance Ranking", EDTB 2002, LNCS 2287, pp. 477-495, 2002, Springer-Verlag Berlin Heidelberg.*
Bhagdev et al., "Hybrid Search: Effectively Combining Keywords and Semantic Searches", ESWC 2008, LNCS 5021, pp. 554-568, Springer-Verlag Berlin Heidelberg, 2008.*
"U.S. Appl. No. 11/933,111", filed Oct. 31, 2007.
"U.S. Appl. No. 12/023,931", filed Jan. 31, 2008.
"U.S. Appl. No. 12/030,158", filed Feb. 12, 2008.
"U.S. Appl. No. 12/030,153", filed Feb. 12, 2008.
"U.S. Appl. No. 12/023,941", filed Jan. 31, 2008.
"U.S. Appl. No. 12/098,338", filed Apr. 4, 2008.

* cited by examiner

*Primary Examiner* — Michael Hicks
(74) *Attorney, Agent, or Firm* — Dergosits & Noah LLP; Todd A. Noah

(57) ABSTRACT

What is disclosed includes a method for searching objects in response to a query that includes a first set of criteria pertaining to a first index, a second set of criteria pertaining to a second index, and logic joining the first set of criteria and the second set of criteria. The method includes querying the first and second indexes based on the first and second set of criteria, respectively, to obtain a first set of first-identifier values and a first set of second-identifier values, respectively. The method also includes correlating the first set of second-identifier values with a set of unique-identifier values and/or a second set of first-identifier values. The method also includes using the logic and, the set of unique-identifier values, and/or the second set of first-identifier values to determine a set of matched objects.

20 Claims, 5 Drawing Sheets

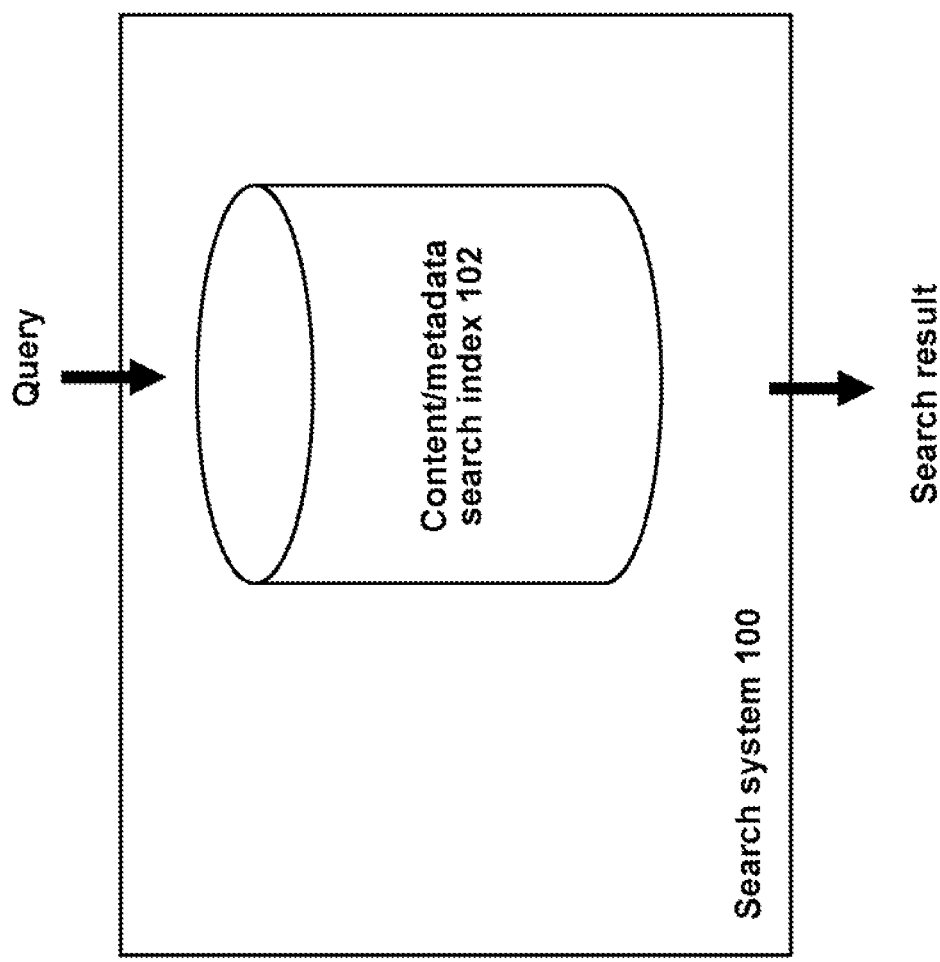

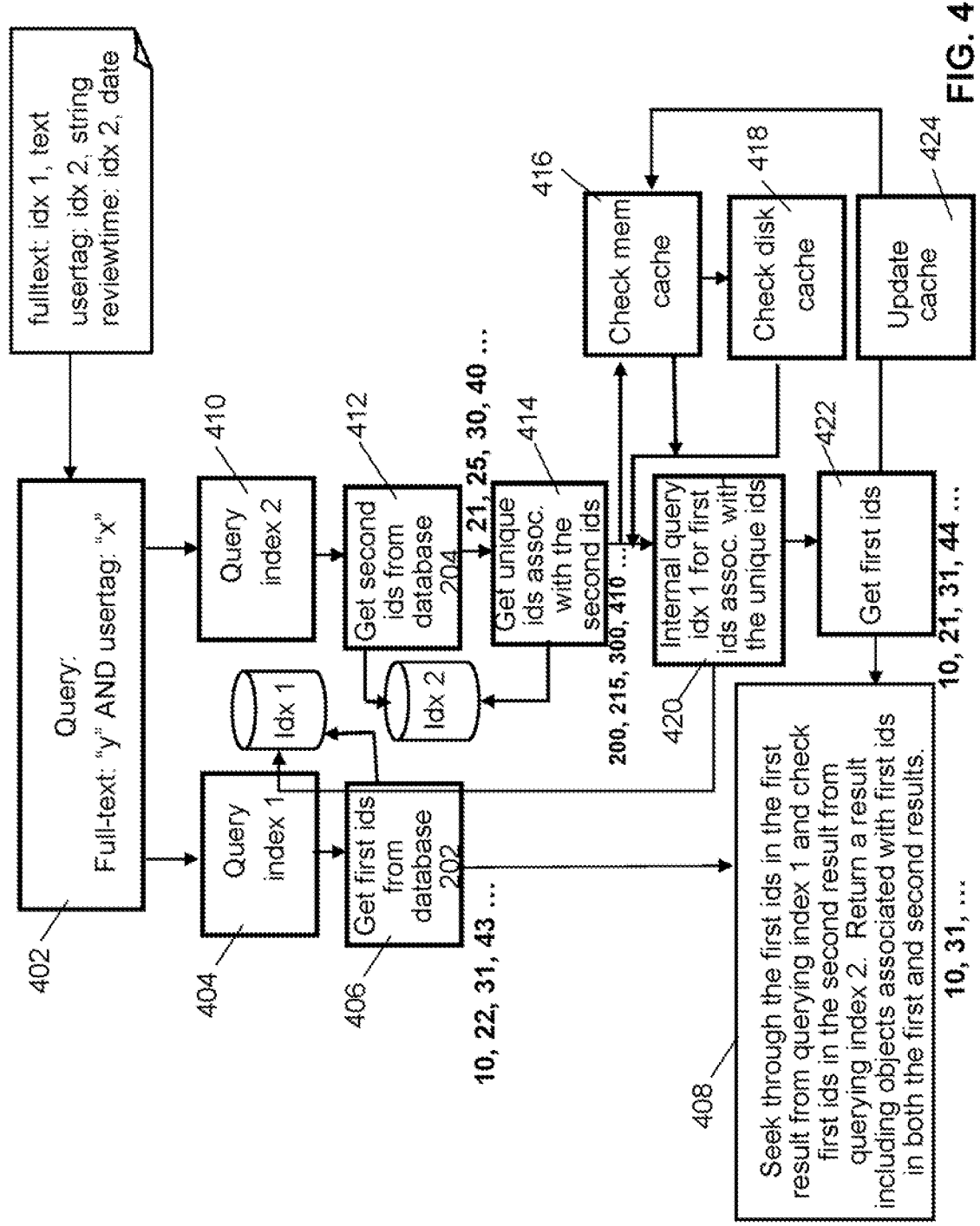

SYSTEMS AND METHODS FOR FACILITATING SEARCHES INVOLVING MULTIPLE INDEXES

BACKGROUND OF THE INVENTION

The present invention relates to systems and methods for facilitating searches that involve multiple indexes, e.g., a content index and a metadata index. As an example, a search query may request searching for files that simultaneously meet two criteria: containing the key word "patent" (involving a content index) and having been reviewed by the reviewer "John Brown" (involving a metadata index). There may be problems with prior art systems and methods in handling such search queries, as discussed with reference to the following examples of FIGS. 1A and 1B.

FIG. 1A shows a schematic representation of an example prior art search system 100 (hereinafter "system 100"). System 100 may include a content/metadata search index 102 for storing both content field entries and metadata field entries (i.e., both content and metadata information for facilitating searches) for all objects (e.g., files, documents, messages, etc.) stored in a data repository.

In system 100, whenever a metadata field entry needs to be updated in response to a change in the metadata of an object, for example, after the object has been reviewed by a reviewer, both the metadata field entry and the content field entry associated with the object will have to be updated. Since the content of the object has not been changed, the update of the content field entry may represent waste of computing/processing resource.

In general, metadata may be frequently changed, while content data may be infrequently changed. With redundant updates of content field entries performed without content of objects being changed, system 100 may involve substantial inefficiency in resource utilization.

FIG. 1B shows a schematic representation of an example prior art search system 150 (hereinafter "system 150"). System 150 may include a content search index 152 for storing content field entries and a metadata search index 154 for storing metadata field entries. With content field entries uncoupled from metadata field entries, redundant updates of content field entries (as with system 100 discussed in the example of FIG. 1A) may be avoided.

However, with the content index and the metadata index being uncoupled, system 150 may not be able to satisfactorily respond to search queries that involve both the content index and the metadata index. For example, a search query for files that simultaneously meet the two criteria of containing the keyword "patent" and having been reviewed by the reviewer "Mike Brown" may result in two sets of files: a set of files containing the keyword "patent" and a set of files having been reviewed by the review "John Brown." In other words, the search result may include files satisfying the first criteria "OR" the second criteria, but not satisfying both the first criteria "AND" the second criteria as required by the search query.

In order to join separate results obtained from querying the content index and the metadata index according to the logic required in search queries, system 150 may include a mapping database 156 for correlating the content field entries and the metadata field entries. However, mapping database 156 may substantially increase the implementation, management, and/or maintenance costs for system 150. Further, the operation of mapping database 156 for performing the correlation may degrade the efficiency of system 150 in responding to search queries.

SUMMARY OF INVENTION

An embodiment of the present invention relates to a computer-implemented method for searching a set of objects in response to a query that includes at least a first set of criteria pertaining to a first index, a second set of criteria pertaining to a second index, and logic joining at least the first set of criteria and the second set of criteria. The method includes querying the first index based on the first set of criteria to generate a first result that includes a first set of first-identifier values associated with a first set of objects. The method also includes querying the second index based on the second set of criteria to generate a second result that includes a first set of second-identifier values associated with a second set of objects. The method also includes correlating the first set of second-identifier values with a set of unique-identifier values and/or a second set of first-identifier values resulted from processing the first set of second-identifier values and/or first set of first-identifier values. The method also includes using the logic and, the set of unique-identifier values, and/or the second set of first-identifier values to determine a set of matched objects.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A shows a schematic representation of an example prior art search system.

FIG. 4 shows a flowchart illustrating a method for performing searches involving multiple indexes in accordance with one or more embodiments of the present invention.

DETAILED DESCRIPTION OF EMBODIMENTS

Figure 1B:
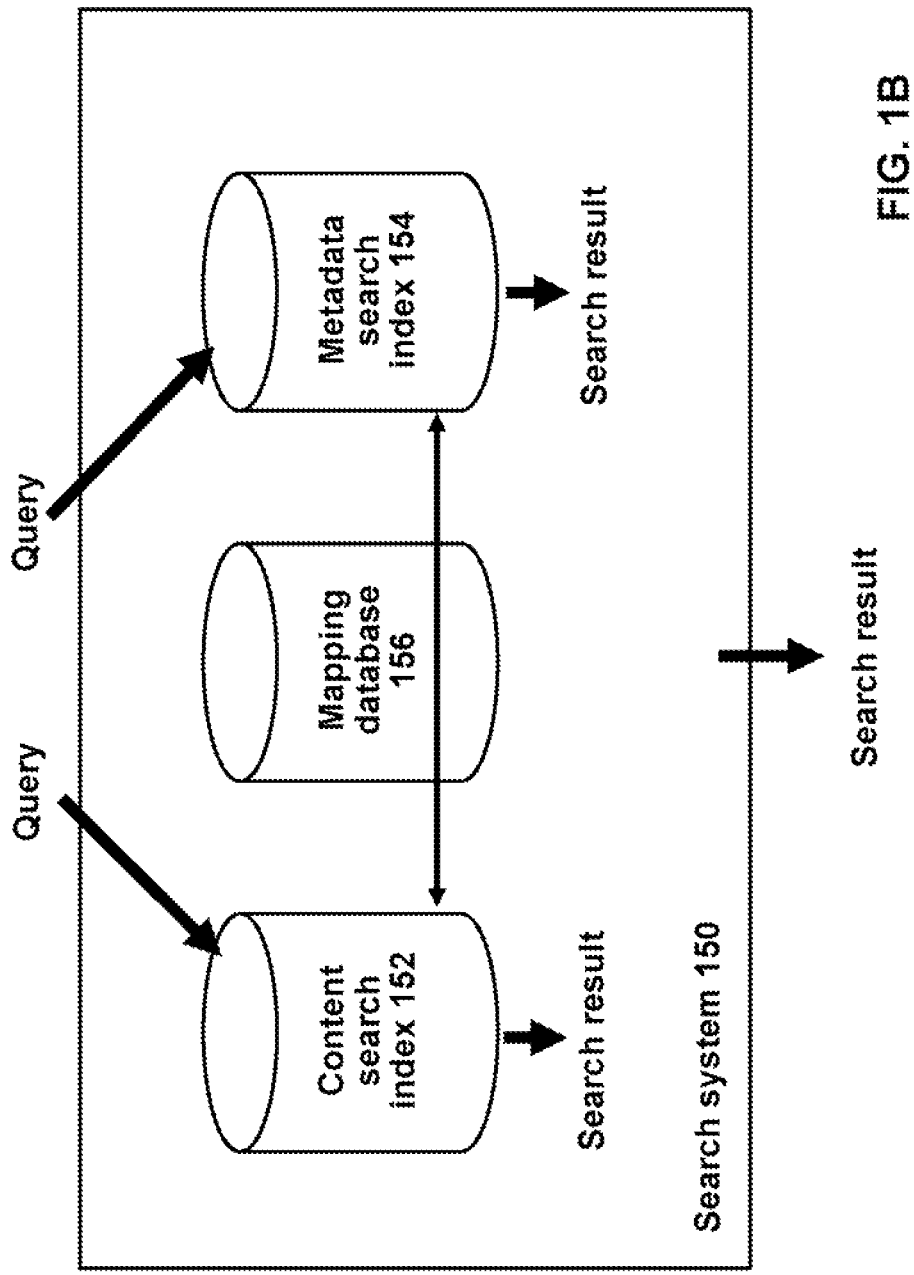
FIG. 1B shows a schematic representation of an example prior art search system.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

One or more embodiments of the present invention relate to a computer-implemented method for searching objects stored in one or more repositories. The method may be utilized in handling search queries that contain multiple criteria pertaining to multiple indexes. The method may include uncoupling information by storing the data fields (e.g., different field categories or different fields) of each document in different search indexes. The group of search indexes containing the fields of the same document (or group of documents) is called a set of uncoupled indexes. The method may also include assigning identifiers for the objects and utilizing the identifiers to join the results obtained from querying the set of uncoupled indexes. Advantageously, embodiments of the invention may prevent the redundant updates of field entries and the costly mapping databases required in the prior art, thereby facilitating/performing searches in a cost-effective fashion.

As an example, the method may include receiving a query that includes a first set of criteria, a second set of criteria, and logic (or a set of logical operators) joining the first set of criteria and the second set of criteria. The first set of criteria may pertain to a first search index, e.g., a static index or a content index. The second set of criteria may pertain to a second search index, e.g., a dynamic index or metadata index. Each set of criteria may include one or more search criteria. For example, the query may require each object in a search result to satisfy both "author name=Mike Brown or Joe White" (i.e., a criteria pertaining to the first search index) AND "reviewer name=Jim Green or Bob Black" (i.e., a criteria pertaining to the second search index).

The method may also include providing and associating identifiers for the objects. For example, for each object, the method may include providing a first identifier, a second identifier, and a unique identifier for the object. The value of the unique identifier may remain constant (e.g., "200"), but the values of the first identifier and the second identifier may be changed in response to reindexing of the object, which may be caused by a change to the object. The value of the first identifier of each object is unique in the first index; the value of the second identifier of each object is unique in the second index. The values for the first identifiers and the second identifiers may be assigned according to one or more predefined rules. For example, if an object in the first search index is changed/reindexed, the object may be assigned the next available unique first identifier value in the first index.

The method may include querying the first index according to the first set of criteria to identify the values (e.g. "10," "22," "31," "43," etc.) of the identifiers associated with the objects in the first index that satisfy the first set of criteria (e.g., "author name=Mike Brown or Joe White"). The method may also include querying the second index according to the second set of criteria to identify the values (e.g. "21," "25," "30," "40," etc.) of the identifiers of the objects that satisfy the first set of criteria (e.g., reviewer name=Jim Green or Bob Black).

The method may also include processing the values of the first identifiers and/or the values of the second identifiers to correlate the values of the second identifiers with the values of their corresponding unique identifiers (e.g., "200," "215," "300,", "410," etc., respectively) and/or the values of their corresponding first identifiers (e.g., "10," "21," "31,", "44," etc. respectively). The method may also include determining, based at least in part on the logic provided in the query and the corresponding identifiers, which objects are to be included in the search result. For example, if the logic represents "AND," then the object with the unique identifier value "200" (or with the first identifier values "10") and the object with the unique identifier value "300" (or with the first identifier values "31") will be included in the search result.

The method may be applied to other objects in the repository or repositories. The method may also include caching the correlations performed for different objects in responding to different queries, thereby further improving efficiency and resource utilization.

One or more embodiments of the invention may relate to a system that performs one or more steps in the method.

The features and advantages of the invention may be better understood with reference to the figures and discussions that follow.

Figure 2:
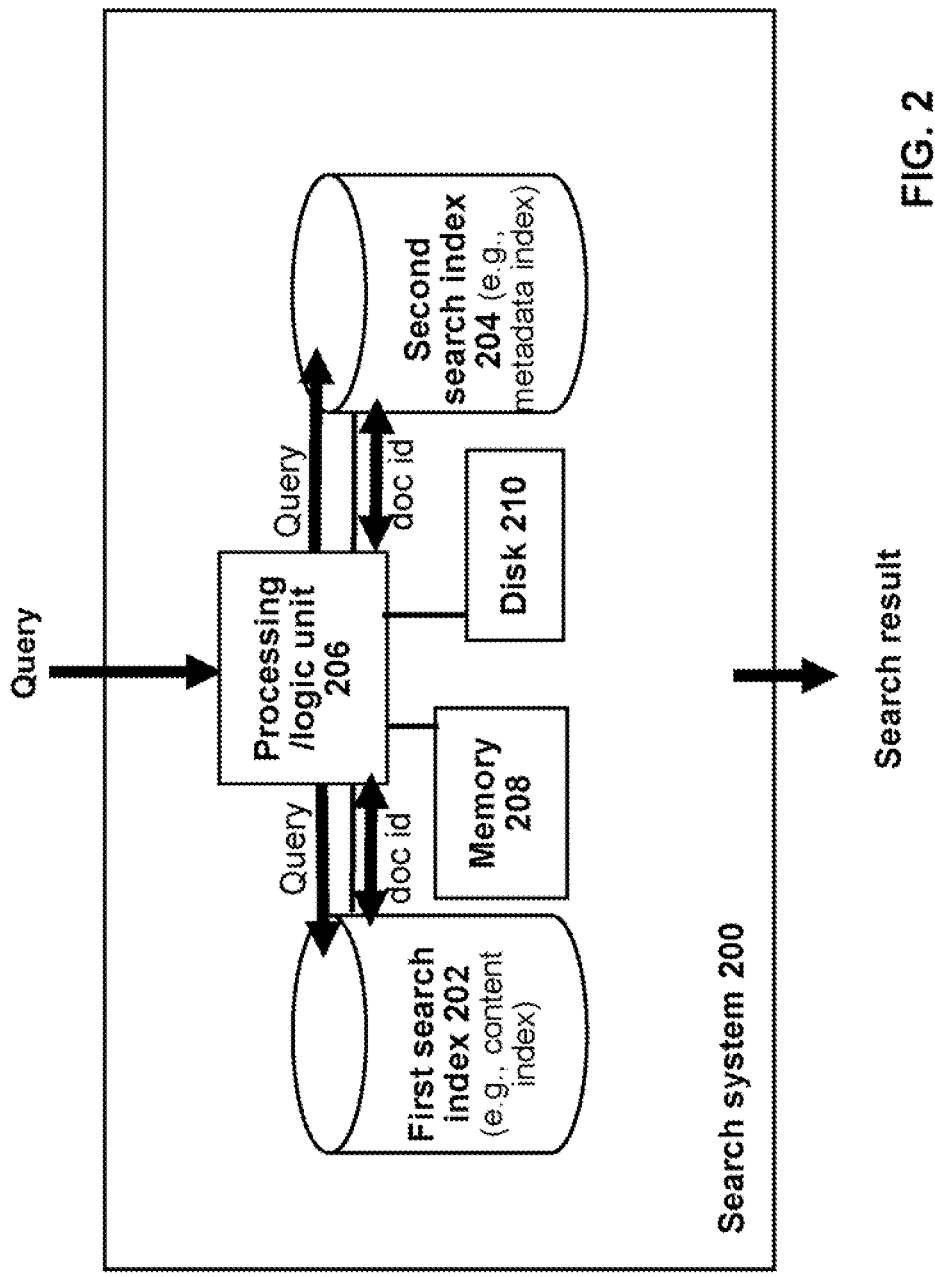
FIG. 2 shows a schematic representation of a search system in accordance with one or more embodiments of the present invention.

FIG. 2 shows a schematic representation of a search system 200 (hereinafter "system 200") in accordance with one or more embodiments of the present invention. System 200 may facilitate searches for objects stored in one or more repositories and may facilitate searches involving multiple indexes. System 200 may include multiple search indexes (e.g., search indexes 202 and 204), a processing/logic unit (e.g., a processing/logic unit 206) or separate processing and logic units, and at least a memory element or an additional storage element (e.g. memory 208 and disk 210), as discussed below.

The search indexes may be configured according to user needs. For example, system 200 may include separate search indexes associated with different projects, different user groups, different data characteristics, and/or different search performance requirements. As an example, a high-importance index that is needed for fast responses to search queries may be stored in a high-performance database storage device; a relatively low-importance index needed for search queries that allow a relative longer response time may be stored in a relatively low-cost, low-performance database storage device. Advantageously, system 200 may be flexible, manageable, and cost-effective.

in one or more embodiments, the search indexes may include a first search index 202 that may represent a content data index or a static data index. The search indexes may also include a second search index 204 that may represent a metadata index or a dynamic data index.

Each of first search index 202 and second search index 204 may include several data fields for each of the objects (e.g., files, documents, and/or messages) stored in one or more repositories. For example, first search index 202 may include data fields such as "content keywords" and "author name" for each of the objects; second search index 204 may include data fields such as "reviewer name" and "importance level" for each of the objects.

The indexes may also include data values for the data fields. For example, first search index 202 may include data values "patent" and "Jim Brown" for the data fields "content keywords" and "author name," respectively, for a first document; second search index 204 may include data values "Mike Green" and "High" for the data fields "reviewer name"

and "importance level," respectively, for the first document. Alternatively or additionally, the indexes may include pointers for the data values for the data fields.

Each of the search indexes may also include a unique identifier and an additional identifier for each object. For example, system 200 (or processing/logic unit 206 of system 200) may assign a unique identifier "215" for a second document. The value of the unique identifier remains unchanged. On the other hand, the additional identifier may be assigned different values, e.g., by processing/logic unit 206, whenever the associated object is changed, e.g., reindexed because of a change in any data field.

System 200 may also include processing/logic unit 206. As mentioned above, processing/logic unit 206 may assign the values of the unique identifiers and the additional identifiers for the objects stored in the repository/repositories. Processing/logic unit 206 may also associate the identifier values for the objects. Utilizing the association among the unique identifiers and the additional identifiers, system 200 may facilitate/perform searches involving multiple indexes without the need of a costly mapping database, such as mapping database 156 required in prior art system 150 discussed in the example of FIG. 1B.

Based on the criteria provided in a search query that involves multiple indexes, processing/logic unit 206 may process the search query into multiple queries for querying different indexes (e.g., search indexes 202 and 204) to generate individual search results. Based on the logic provided in the search query, processing/logic unit 206 may also correlate the identifiers of the objects provided in the individual search results to integrate the individual search results into a unified search result.

In one or more embodiments, system 200 may include separate processing and logic modules for performing one or more of the functions of processing/logic unit 206 discussed above.

System 200 may also include a memory element and/or an additional storage element (e.g., memory 208 and disk 210) for caching the information concerning correlation between identifiers that is generated when system 200 performs search actions in response to search queries. The correlation information may be utilized in subsequent search actions for minimizing the amount of accesses to the search indexes. Advantageously, the workload of the search indexes may be reduced, the integration of the individual search results may be expedited, and the performance of system 200 may be further improved.

The methods and advantages of utilizing the identifiers to provide unified search results will be further discussed with reference to the example of FIGS. 3 and 4.

Figure 3:
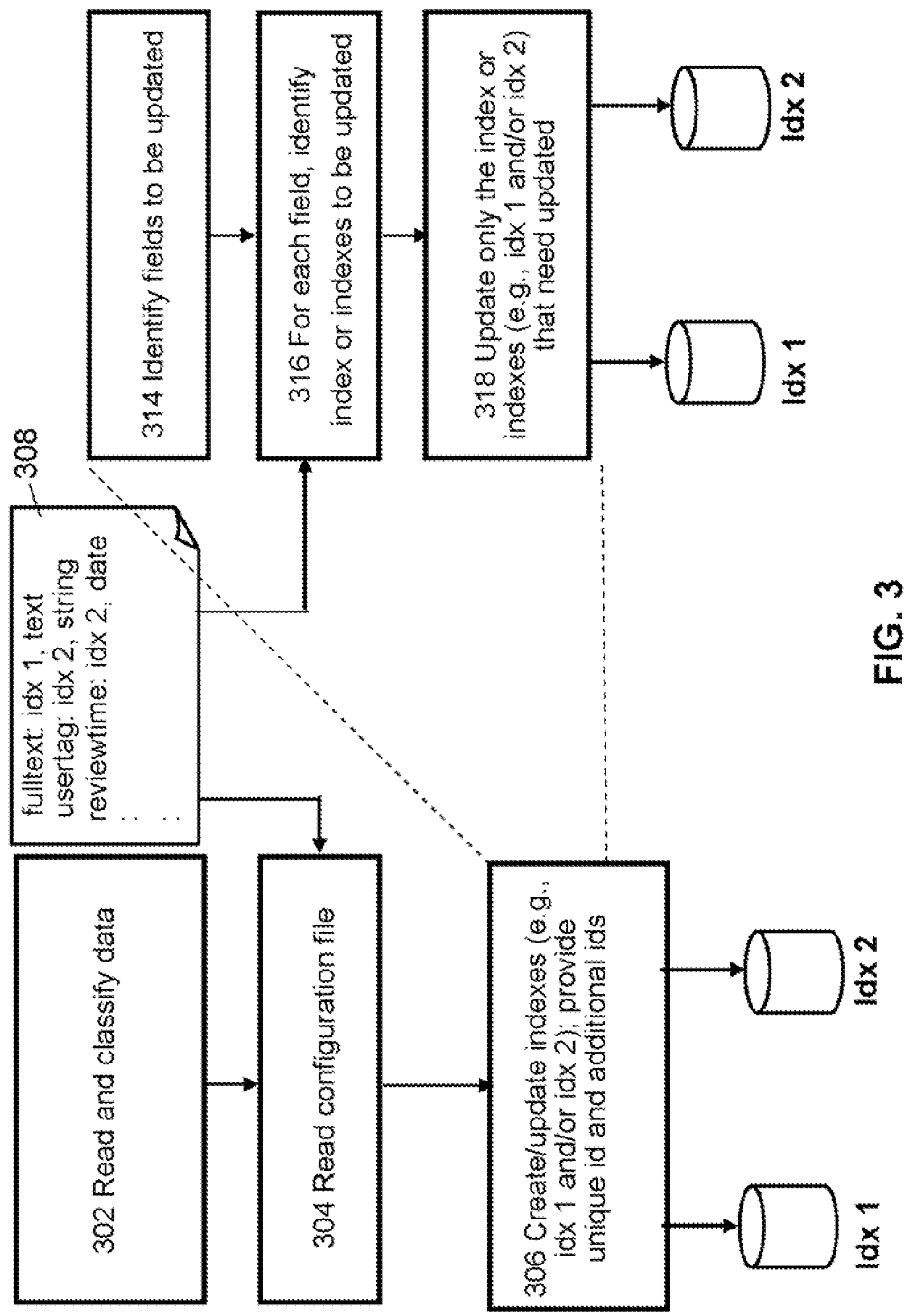
FIG. 3 shows a flowchart illustrating a method for creating and/or updating one or more indexes for facilitating searches involving multiple indexes in accordance with one or more embodiments of the present invention.

FIG. 3 shows a flowchart illustrating a method for creating and/or updating one or more indexes for facilitating searches involving multiple indexes in accordance with one or more embodiments of the present invention. As an illustrative example, the method may involve utilizing system 200 discussed in the example of FIG. 2.

The method may start with step 302, in which system 200 (or processing/logic unit 206) may read and classify data contained in the objects stored in one or more repositories. The data may be classified into different types, such as full text, user tag, review time, etc.

In step 304, system 200 may read a configuration file 308 that defines data fields, formats, etc. for each index.

In step 306, system 200 may create and/or update indexes based at least in part on configuration file 308. For example, full-text data of each object may be associated with first search index 202 (e.g., stored in first search index 202 shown in the example of FIG. 2) and with the "text" format; user-tag data of each object may be associated with second search index 204 (e.g., stored in second search index 204 shown in the example of FIG. 2) and with the "string" format; review-time data of each object may be associated with second search index 204 and with the "date" format.

In step 306, system 200 may also provide a unique identifier for each object. The value of the unique identifier may remain unchanged. The unique identifier of each object may be stored in every search index in system 200.

Depending on the number of indexes in system 200, system 200 may also provide several additional identifiers for each object. In one or more embodiments, the number of additional identifiers for each object may be equal to the number of indexes in system 200. Each additional identifier of an object may be stored in an associated search index in system 200 and may be associated with the unique identifier of the object. For example, given that system 200 has two indexes (i.e., first search index 202 and second search index 204), each object may have a first identifier and a second identifier, in addition to the unique identifier associated with the object. The first identifier may be stored in first search index 202 and associated with the unique identifier; the second identifier may be stored in second search index 204 and also associated with the unique identifier. If system 200 has five indexes, each object may have five additional identifiers, which are stored in the five indexes, respectively, and associated with the unique identifier. The association of the additional identifier through the unique identifier may eliminate the need for mapping database 156 in prior art system 150 discussed in the example of FIG. 1B. Advantageously, system 200 may relatively more cost-effective than system 150.

The values of the additional identifiers may vary with reindexing of the objects, e.g., resulted from a change in the data value of a data field of the objects. As discussed above, according to configuration file 308, system 200 may associate a first data field (e.g., author name) of the object with first search index 202.

For example, if the author name of a file is "David White," the identifier may be given the value "10"; if the author name of the file is changed to "Charles Black," which causes the document to be reindexed, then the identifier may be given the value "35." As another example, if the reviewer name of a file is "Michael Gray," the identifier may be given the value "25"; if the reviewer name of the file is changed to "Charles Black," which causes the document to be reindexed, then the identifier may be given the value "60."

Step 306 may also include steps 314, 316, and 318. In step 314, system 200 may identify the data fields that need to be updated. In one or more embodiments, one or more new data fields may be created and added. In step 316, for each data field to be updated (or added), system 200 may identify the field entries as well as the associated index or indexes that need to be updated. In step 318, system 200 may update only the index or indexes that need to be updated. Accordingly, system 200 may avoid redundant updates for field entries. Advantageously, system 200 may operate with more efficient resource utilization in comparison with prior art system 100 discussed in the example of FIG. 1A.

FIG. 4 shows a flowchart illustrating a method for performing searches involving multiple indexes in accordance with one or more embodiments of the present invention. As an illustrative example, the method may involve utilizing system 200 discussed in the example of FIG. 2.

The method may start with step 402, in which system 200 may receive a query. The query may include multiple sets of search criteria joined by one or more logical operators (e.g., Boolean operators). For example, the query may include a first set of criteria pertaining to first search index 202 and a second set of criteria pertaining to second search index 204. Each set of criteria may include one or more criteria. For example, the first set of criteria may require each item in the search result of the search to have full-text data that include the keyword/text "y"; the second set of criteria may require each item in the search result to have user-tag data that include the string "x." In the example, the two sets of criteria may be joined by the Boolean operator "AND"; that is, the query may require each item in the search result to simultaneously have full-text data that include the text "y" and have user-tag data that include the string "x."

In step 402, system 200 (or processing/logic unit 206) may also separate the query into a first query and a second query. The first query may contain the first set of criteria and may be utilized to query first search index 202; the second query may contain the second set of criteria and may be utilized to query second search index 204.

In step 404, system 200 (or processing/logic unit 206) may query first search index 202 based on the first set of criteria. In return, in step 406, system 200 may obtain a set of first-identifier values, such as 10, 22, 31, 43, etc., from search index 202. The set of first identifier-values may represent the objects in one or more repositories that satisfy the first set of criteria.

In step 410, system 200 (or processing/logic unit 206) may query second search index 204 based on the second set of criteria. As a result, in step 412, system 200 may obtain a set of second-identifier values, such as 21, 25, 30, 40, etc., from search index 204. The set of second-identifier values may represent the objects in the repository or repositories that satisfy the second set of criteria.

In step 414, system 200 (or processing/logic unit 206) may check search index 204 to obtain the unique identifiers that are associated with the obtained second identifier values. For example, unique identifiers 200, 215, 300, 410, etc. may be associated with the second-identifier values 21, 25, 30, 40, etc., respectively.

In steps 416, 418, and/or 420, system 200 (or processing/ logic unit 206) may check one or more of memory 208, disk 210, and search index 202 to determine the first-identifier values that are associated with the unique identifiers 200, 215, 300, 410, etc. which represent the objects that satisfy the second set of criteria. Memory 208 and/or disk 210 may have cached useful association/correlation information concerning unique identifiers and first-identifier values from previous search actions that may be reused. Accordingly, the amount of accesses to search index 202 may be reduced, and the workload of search index 202 may be reduced. Advantageously, the performance of search index 202 in responding to queries concerning the first set of criteria may be improved.

In step 422, system 200 may obtain the first-identifier values, for example, 10, 21, 31, 44, etc. that are associated with the unique identifiers 200, 215, 300, 410, etc. The first-identifier values 10, 21, 31, 44, etc. may also represent the objects that satisfy the second set of criteria.

In step 424, system 200 (or processing/logic unit 206) may update the cache(s) in memory 208 and/or disk 210 with the identifier association/correlation information that is obtained from search index 202 in step 420 and that has not been cached previously. Accordingly, the performance of memory 208, disk 210, and/or search index 202 may be further improved for subsequently search actions.

In step 408, based on the logic required in the query received in step 402, system 200 (or processing/logic unit 206) may perform one or more logical operations on the first-identifier values obtained from querying first search index 202 (i.e. a first result) and the first-identifier values obtained from querying second search index 204 (i.e., a second result). In the example, given that the logical operator in the query is "AND," system 200 will provide representations of the objects associated with the first-identifier values 10, 31, etc., which are obtained from both querying first search index 202 and querying second search index 204.

In one or more embodiments, the first-identifier values obtained from querying first search index 202 may be translated into associated unique identifiers; and logical operations may be performed on the unique identifiers obtained from querying first search index 202 and the unique identifiers obtained from querying second search index 204.

As can be appreciated from the foregoing, embodiments of the invention may enable searches that involve multiple indexes in a relatively cost-effective fashion, e.g., in comparison with prior art systems and/or methods. For example, embodiments of the invention may not require additional mapping search indexes. Advantageously, embodiments of the invention may involve relatively low implementation and/or operation costs; alternatively or additionally, embodiments of the invention may also provide relatively fast responses to search queries.

Embodiments of the invention may also prevent redundant updates performed for field entries associated with data that have not been changed. Advantageously, the utilization of resource may be optimized.

Embodiments of the invention may also utilize different (and separate) storage devices of different performance levels for storing different indexes associated with different performance requirements. Advantageously, the flexibility, manageability, and cost-effectiveness of the embodiments may be further improved.

Embodiments of the invention may also cache information concerning the correlation between identifiers. As a result, the integration of individual search results may be expedited with the cached information and with reduced accesses to index search indexes. Advantageously, the utilization of search index may be further improved, and the efficiency in responding to search queries also may be further improved.

While this invention has been described in terms of several embodiments, there are alterations, permutations, and equivalents, which fall within the scope of this invention. It should also be noted that there are many alternative ways of implementing the methods and apparatuses of the present invention. Furthermore, embodiments of the present invention may find utility in other applications. The abstract section is provided herein for convenience and, due to word count limitation, is accordingly written for reading convenience and should not be employed to limit the scope of the claims. It is therefore intended that the following appended claims be interpreted as including all such alterations, permutations, and equivalents as fall within the true spirit and scope of the present invention.

What is claimed is:

1. A computer-implemented method for searching a set of objects stored in one or more repositories in response to receiving a query, the objects being data objects each having an associated identifier value and a unique-identifier value stored in one or more search indexes, the method comprising:

querying a first index based on a first set of criteria to generate a first result, the first result including a first set of first-identifier values;

querying a second index based on a second set of criteria to generate a second result, the second result including a first set of second-identifier values;

retrieving, from the second index, a set of unique-identifier values corresponding to the first set of second-identifier values;

mapping the retrieved set of unique-identifier values to their corresponding first-identifiers in the first index to generate a second set of first-identifier values; and determining a set of matched objects to be included in a search result based on one or more logical operations performed on the first set of first-identifier values and the second set of first-identifier values.

2. The method of claim 1, wherein the one or more logical operations are based at least in part on one or more logical operators included in the query.

3. The method of claim 1, wherein the second set of first-identifier values includes identifier values of the first index that represent objects returned by the query of the second index.

4. The method of claim 1, wherein the mapping includes using correlation information stored in a cache, the correlation information pertaining to the retrieved set of unique-identifier values and their corresponding first-identifiers in the first index.

5. The method of claim 1 further comprising caching correlation information pertaining to at least two of the second set of first-identifier values, the first set of second-identifier values, and the retrieved set of unique-identifier values.

6. The method of claim 1 further comprising:
for each object in the set of objects,
assigning a first-identifier value associated with the first index;
assigning a second-identifier value associated with the second index;
assigning a unique-identifier value;
including the first-identifier value and the unique-identifier value in the first index; and
including the second-identifier value and the unique-identifier value in the second index.

7. The method of claim 6 further comprising:
for the each object in the set of objects,
assigning one or more additional-identifier values associated with one or more additional indexes; and
including the one or more additional-identifier values in the one or more additional indexes.

8. The method of claim 7 wherein the first index represents a content index, the second index represents a metadata index, and the one or more additional indexes include at least a project index and a user group index.

9. The method of claim 1 further comprising:
associating a first object with a first-identifier value;
associating the first object with a second-identifier value;
associating the first object with a unique-identifier value;
associating the first object with a different first-identifier value in response to reindexing of the first object; and
including the different first-identifier value in the first index.

10. The method of claim 9 further comprising:
associating the first object with a different second-identifier value in response to the reindexing of a second object; and
including the different second-identifier value in the second index.

11. The method of claim 10 further comprising continuing to associate the first object with the same unique-identifier value regardless of the reindexing of the second object, wherein the unique-identifier value is included in the first index and the second index.

12. The method of claim 1 wherein the first index represents a static index, and the second index represents a dynamic index.

13. A computer-implemented method for searching a set of objects stored in one or more repositories, the objects being data objects each having an associated identifier value and a unique-identifier value stored in one or more search indexes, the method comprising:
receiving a query, the query including at least a first set of criteria, a second set of criteria, and one or more logical operators;
querying a first index based on the first set of criteria to generate a first result, the first result including a first set of first-identifier values;
querying a second index based on the second set of criteria to generate a second result, the second result including a first set of second-identifier values;
retrieving, from the second index, a set of unique-identifier values corresponding to the first set of second-identifier values;
mapping the retrieved set of unique-identifier values to their corresponding first-identifiers in the first index to generate a second set of first-identifier values; and
determining a set of matched objects to be included in a search result based on one or more logical operations performed on the first set of first-identifier values and the second set of first-identifier values, the set of match objects being a unified result generated by joining the first result and the second result.

14. The method of claim 13, wherein the second set of first-identifier values is obtained from at least one of a cache and the first index.

15. The method of claim 14, wherein the cache stores correlation information pertaining to at least two of the second set of first-identifier values, the first set of second-identifier values, and the retrieved set of unique-identifier values.

16. The method of claim 14 further comprising updating the cache in response to the mapping, wherein the cache is updated to include a portion of the second set of first-identifier values obtained from the first index.

17. The method of claim 13 further comprising changing one or more of the second identifier values in response to changing one or more data values of data fields associated with the set of objects.

18. A computer-implemented method comprising:
assigning to a plurality of documents stored in one or more repositories a plurality of unique-identifier values, a plurality of first-identifier values, and a plurality of second-identifier values, the plurality of documents comprising content and metadata;
creating for the plurality of documents a first index comprising a first field, a second field, and a third field, the first field storing a unique-identifier value assigned to a document, the second field storing a first-identifier value assigned to the document, and the third field storing content from the document;
creating for the plurality of documents a second index comprising a fourth field, a fifth field, and a sixth field, the fourth field storing the unique-identifier value assigned to the document, the fifth field storing a second-identifier value assigned to the document, and the sixth field storing metadata from the document;
receiving a query comprising at least a first set of criteria, a second set of criteria, and one or more logical operators;
querying the third field of the first index using the first set of criteria to generate a first result, the first result including a first set of first-identifier values, each of the first set of first-identifier values identifying a document having content that satisfies the first set of criteria;

querying the sixth field of the second index using the second set of criteria to generate a second result, the second result including a first set of second-identifier values, each of the first set of second-identifier values identifying a document having metadata that satisfies the second set of criteria;

retrieving, from the second index, a set of unique-identifier values corresponding to the first set of second-identifier values;

mapping the retrieved set of unique-identifier values to their corresponding first-identifiers in the first index to generate a second set of first-identifier values; and determining a set of matched objects to be included in a search result based on one or more logical operations performed on the first set of first-identifier values and the second set of first-identifier values.

19. The method of claim 18 further comprising:

changing the first-identifier value assigned to the document to a different first-identifier value when the content included in the document is changed, wherein the first-identifier value is changed without changing the unique-identifier value assigned to the document; and not updating the second index when the content from the document is changed and the metadata from the document is not changed.

20. The method of claim 19 further comprising assigning to the plurality of documents a plurality of additional identifiers associated with one or more additional indexes.

* * * * *